(12) United States Patent  
DeCusatis et al.

(10) Patent No.: US 9,031,415 B2  
(45) Date of Patent: *May 12, 2015

(54) ADAPTOR SYSTEM FOR AN ETHERNET NETWORK

(71) Applicant: International Business Machines Corporation, Armonk, NY (US)

(72) Inventors: Casimer M. DeCusatis, Poughkeepsie, NY (US); Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,937

(22) Filed: Dec. 8, 2012

(65) Prior Publication Data

US 2013/0101284 A1 Apr. 25, 2013

Related U.S. Application Data

(63) Continuation of application No. 13/029,536, filed on Feb. 17, 2011.

(51) Int. Cl.
*H04B 10/00* (2013.01)
*H04B 10/07* (2013.01)
*H04J 3/14* (2006.01)

(52) U.S. Cl.
CPC ............ *H04B 10/07* (2013.01); *H04J 2203/006* (2013.01); *H04J 2203/0085* (2013.01); *H04J 3/14* (2013.01)

(58) Field of Classification Search
CPC .... H04B 10/03; H04B 10/032; H04B 10/035; H04B 10/038; H04B 10/079; H04B 10/0791; H04B 10/0795; H04B 10/0799; H04B 10/504; H04B 10/5055; H04B 10/66; H04B 10/69; H04J 14/02; H04J 3/00; H04J 3/06; H04J 3/16

USPC ......... 398/79, 33, 38, 177, 17, 20, 22, 23, 24, 398/25, 26, 27, 154, 155, 158, 159, 135, 398/136, 202, 208, 209, 183, 193, 194; 370/352, 389, 392, 252, 235, 468, 535, 370/539, 464, 466

See application file for complete search history.

(56) References Cited

U.S. PATENT DOCUMENTS

| | | |
|---|---|---|
| 7,257,616 B2 | 8/2007 | Bass et al. |
| 7,505,477 B2 | 3/2009 | He et al. |
| 7,505,481 B2 | 3/2009 | He et al. |
| 7,545,868 B2 | 6/2009 | Kennedy et al. |
| 7,565,455 B2 | 7/2009 | He et al. |
| 2004/0105459 A1 | 6/2004 | Mannam |

(Continued)

*Primary Examiner* — Hanh Phan  
(74) *Attorney, Agent, or Firm* — Steven Chiu

(57) ABSTRACT

An Ethernet adapter system may include a transmitter to insert a payload type identifier sequence in a generic frame procedure header to indicate that a network is a converged enhanced Ethernet network. The transmitter may insert idle sequences in a stream of data frames transmitted along a link. The system may include a receiver to recognize a condition and to force a loss of synchronization condition on the link that will be converted by the receiver into a loss of light condition. The receiver may scan the transmitted stream of data frames for invalid data frames and introduce a code into the stream of data frames whenever an invalid data frame is detected.

8 Claims, 11 Drawing Sheets

(56) References Cited

U.S. PATENT DOCUMENTS

| | | |
|---|---|---|
| 2006/0268943 A1* | 11/2006 | DeCusatis et al. ............ 370/539 |
| 2007/0065078 A1 | 3/2007 | Jiang |
| 2009/0067441 A1 | 3/2009 | Ansari et al. |
| 2009/0110085 A1 | 4/2009 | Kennedy et al. |
| 2009/0190466 A1* | 7/2009 | Girardi et al. ................. 370/216 |
| 2009/0323727 A1 | 12/2009 | Surek |
| 2011/0150466 A1* | 6/2011 | Loprieno et al. ................ 398/45 |
| 2012/0213507 A1* | 8/2012 | DeCusatis et al. .............. 398/24 |

* cited by examiner

ADAPTOR SYSTEM FOR AN ETHERNET NETWORK

CROSS-REFERENCE TO RELATED APPLICATIONS

This is a Continuation Application to U.S. patent application Ser. No. 13/029,536 entitled "ADAPTOR SYSTEM FOR AN ETHERNET NETWORK", filed Feb. 17, 2011, which application is incorporated herein by reference.

BACKGROUND

The invention relates to the field of computer networking, and, more particularly, to Ethernet networks.

Long distance connectivity across metropolitan area fiber optic networks is typically based on Generic Frame Procedure (GFP) protocols. Data transmission across metropolitan area distances (100 to 300 kilometers) is described in the International Telecommunications Union (ITU) document G.7041 and is called GFP. CEE uses 64/66B encoding for transmission over long distance.

SUMMARY

According to one embodiment of the invention, an Ethernet adapter system may include a transmitter to insert a payload type identifier sequence in a generic frame procedure header to indicate that a network is a converged enhanced Ethernet network. The transmitter may insert idle sequences in a stream of data frames transmitted along a link.

The system may also include a receiver to recognize a condition and to force a loss of synchronization condition on the link that will be converted by the receiver into a loss of light condition. The receiver may scan the transmitted stream of data frames for invalid data frames and introduce a code into the stream of data frames whenever an invalid data frame is detected.

The recognized condition may comprise loss of synchronization and/or loss of light. The forcing may comprise using unrecognized characters.

The invalid data frame comprises an illegal character and/or a disparity error. The idle sequences may comprise pairs of idle sequences that preserve a direct current balance.

The idle sequences may be restricted on a per data frame basis. The loss of synchronization converted by the receiver into a loss of light condition may be based upon a timeout value.

Another aspect of the invention is an adapter method for a Converged Enhanced Ethernet network. The method may include inserting a payload type identifier sequence in a generic frame procedure header to indicate that a network is a converged enhanced Ethernet network. The method may also include inserting idle sequences in a stream of data frames transmitted along a link. The method may further include recognizing a condition and forcing a loss of synchronization condition on the link that will be converted by a receiver into a loss of light condition. The method may additionally include scanning the transmitted stream of data frames for invalid data frames and introducing a code into the stream of data frames whenever an invalid data frame is detected.

The recognized condition comprises loss of synchronization and/or loss of light. The method may also include using unrecognized characters during the forcing of the loss of synchronization condition on the link.

The method may further include using at least one of an illegal character and a disparity error for the invalid data frame. The method may additionally include preserving a direct current balance by using idle sequences comprising pairs of idle sequences.

The method may also include restricting on a per data frame basis the idle sequences. The method may further include converting the loss of synchronization by the receiver into a loss of light condition based upon a timeout value.

Another aspect of the invention is a computer readable program codes coupled to tangible media to improve a converged enhanced Ethernet network. The computer readable program codes may be configured to cause the program to insert a payload type identifier sequence in a generic frame procedure header to indicate that a network is a converged enhanced Ethernet network. The computer readable program codes may also insert idle sequences in a stream of data frames transmitted along a link. The computer readable program codes may further recognize a condition and force a loss of synchronization condition on the link that will be converted by a receiver into a loss of light condition. The computer readable program codes may additionally scan the transmitted stream of data frames for invalid data frames and introduce a code into the stream of data frames whenever an invalid data frame is detected.

The computer readable program codes may also use unrecognized characters during the forcing of the loss of synchronization condition on the link. The computer readable program codes may further use an illegal character and/or a disparity error for the invalid data frame. The computer readable program codes may additionally preserve a direct current balance by using idle sequences comprising pairs of idle sequences.

The computer readable program codes may also restrict on a per data frame basis the idle sequences. The computer readable program codes may further convert the loss of synchronization by the receiver into a loss of light condition based upon a timeout value.

DETAILED DESCRIPTION

The invention will now be described more fully hereinafter with reference to the accompanying drawings, in which preferred embodiments of the invention are shown. Like numbers refer to like elements throughout, and like numbers with letter suffixes are used to identify similar parts in a single embodiment.

Figure 1:
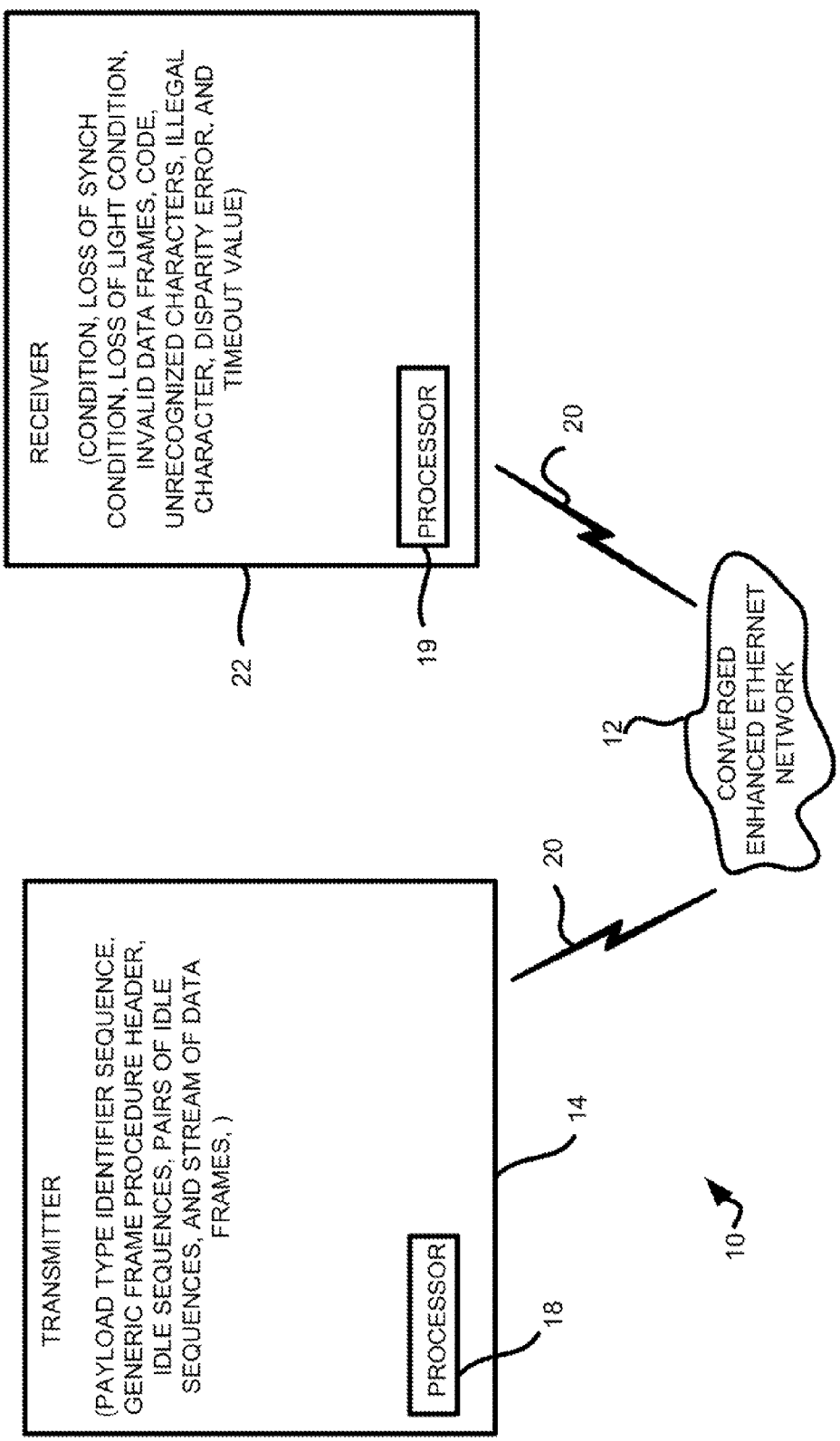
FIG. 1 is a block diagram illustrating a Converged Enhanced network in accordance with the invention.

With reference now to FIG. 1, an adaptor system 10 for a Converged Enhanced Ethernet network 12 is initially described. In an embodiment, the system 10 includes a transmitter 14 to insert a payload type identifier sequence in a generic frame procedure header to indicate that a network is a converged enhanced Ethernet network 16. The transmitter 14 includes a digital circuit, such as a processor 18 or other logic circuitry, and there can be any number of transmitters in system 10. The transmitter 14 also inserts idle sequences in a stream of data frames transmitted along a link 20. There can be any number of links 20 in the system 10.

In one embodiment, the system 10 includes a receiver 22 to recognize a condition and to force a loss of synchronization condition on the link 20 that will be converted by the receiver into a loss of light condition. The receiver 22 includes a digital circuit, such as a processor 19 or other logic circuitry, and there can be any number of receivers in system 10. The receiver 22 scans the transmitted stream of data frames for invalid data frames and introduce a code into the stream of data frames whenever an invalid data frame is detected.

In one embodiment, the recognized condition comprises loss of synchronization and/or loss of light. In another embodiment, the forcing comprises using unrecognized characters.

In one embodiment, the invalid data frame comprises an illegal character and/or a disparity error. In another embodiment, the idle sequences comprise pairs of idle sequences that preserve a direct current balance.

In one embodiment, the idle sequences are restricted on a per data frame basis. In another embodiment, the loss of synchronization converted by the receiver 22 into a loss of light condition is based upon a timeout value.

Figure 2:
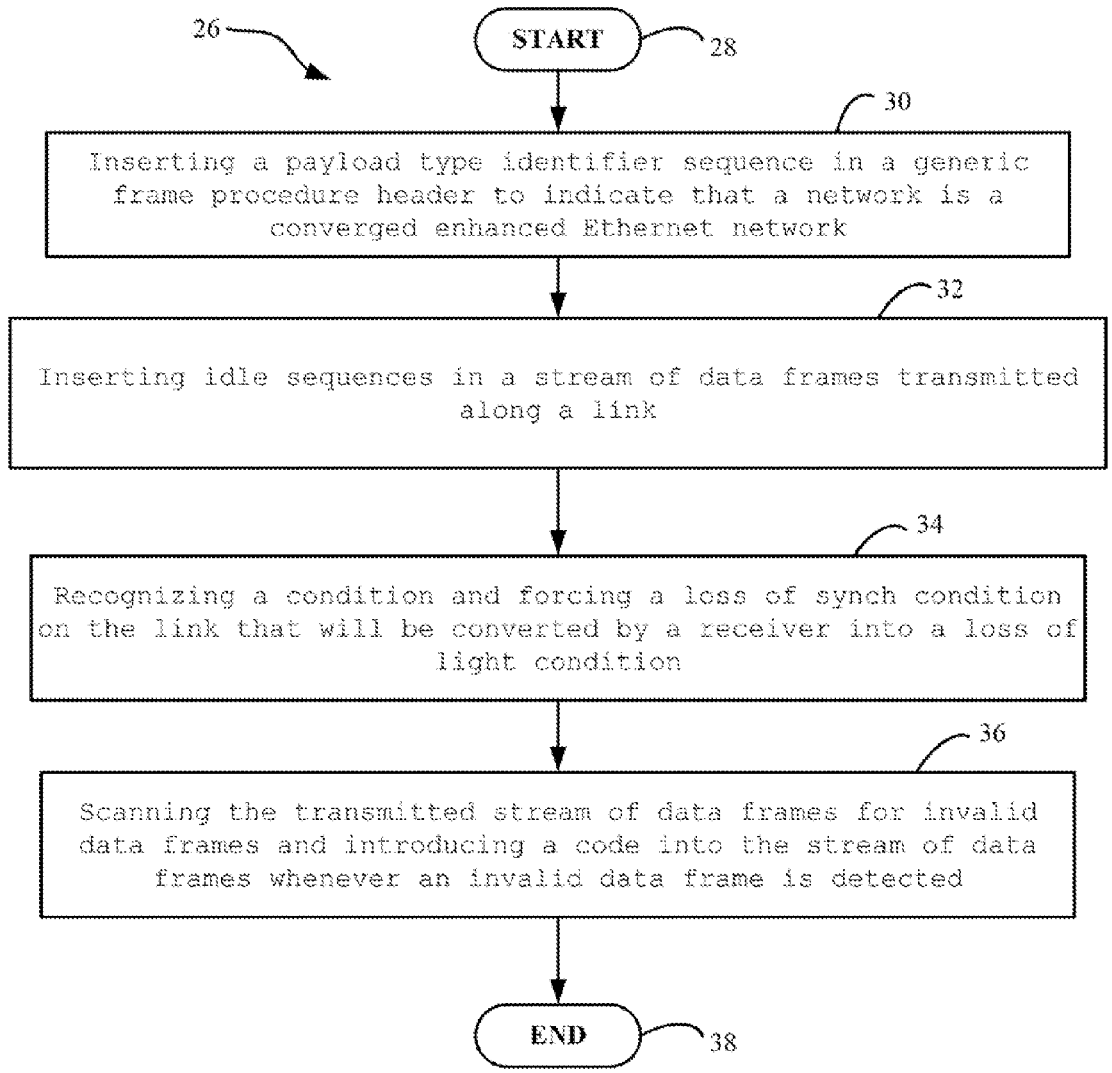
FIG. 2 is a flowchart illustrating method aspects according to the invention.

Another aspect of the invention is an adapter method for a Converged Enhanced Ethernet network 12, which is now described with reference to flowchart 26 of FIG. 2. The method begins at Block 28 and may include inserting a payload type identifier sequence in a generic frame procedure header to indicate that a network is a converged enhanced Ethernet network at Block 30. The method may also include inserting idle sequences in a stream of data frames transmitted along a link at Block 32. The method may further include recognizing a condition and forcing a loss of synchronization condition on the link that will be converted by a receiver into a loss of light condition at Block 34. The method may additionally include scanning the transmitted stream of data frames for invalid data frames and introducing a code into the stream of data frames whenever an invalid data frame is detected at Block 36. The method ends at Block 38. The recognized condition may comprise loss of synchronization and/or loss of light.

Figure 3:
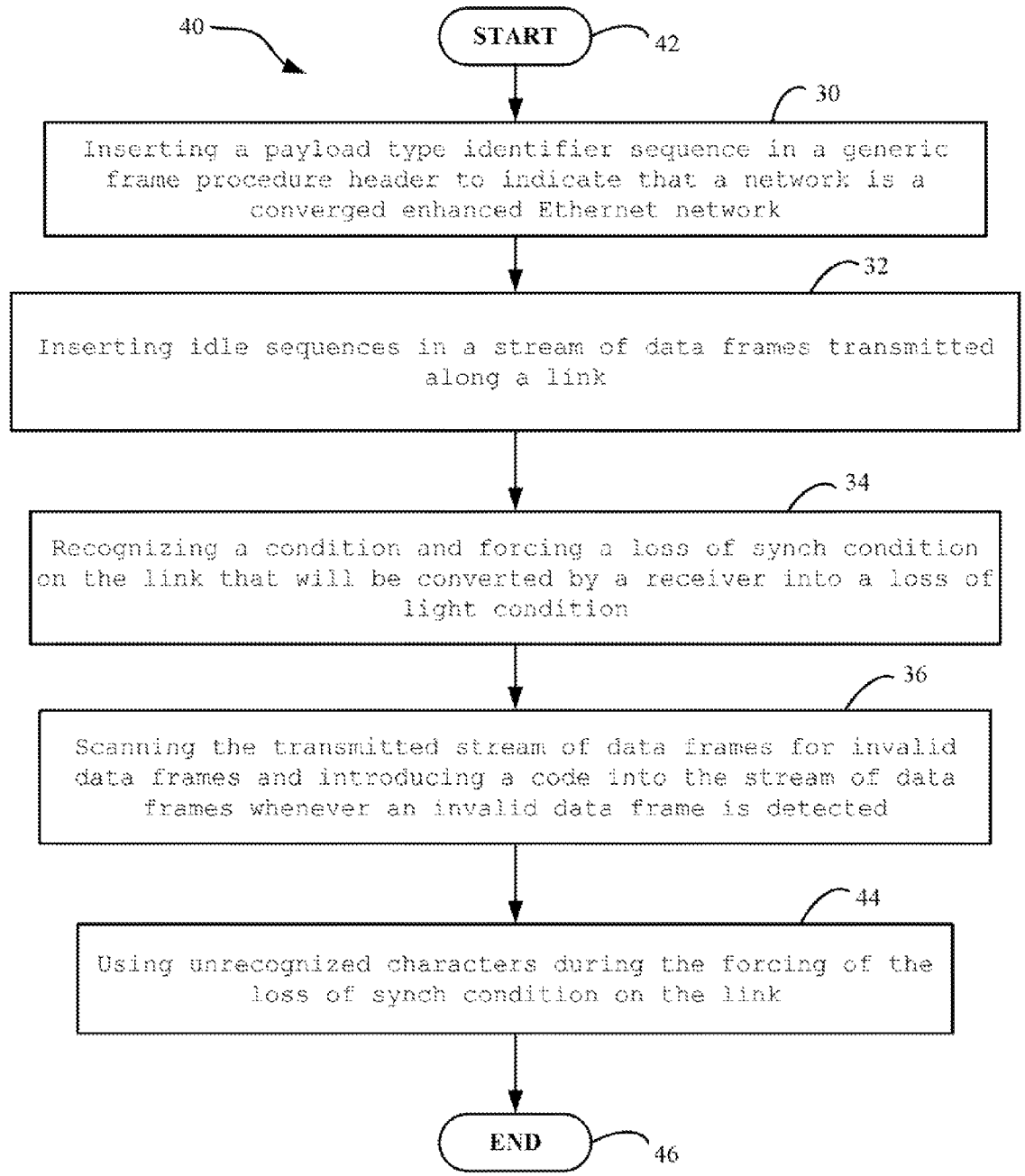
FIG. 3 is a flowchart illustrating method aspects according to the method of FIG. 2.

In another method embodiment, which is now described with reference to flowchart 40 of FIG. 3, the method begins at Block 42. The method may include the steps of FIG. 2 at Blocks 30, 32, 34, and 36. The method may also include using unrecognized characters during the forcing of the loss of synchronization condition on the link at Block 44. The method ends at Block 46.

Figure 4:
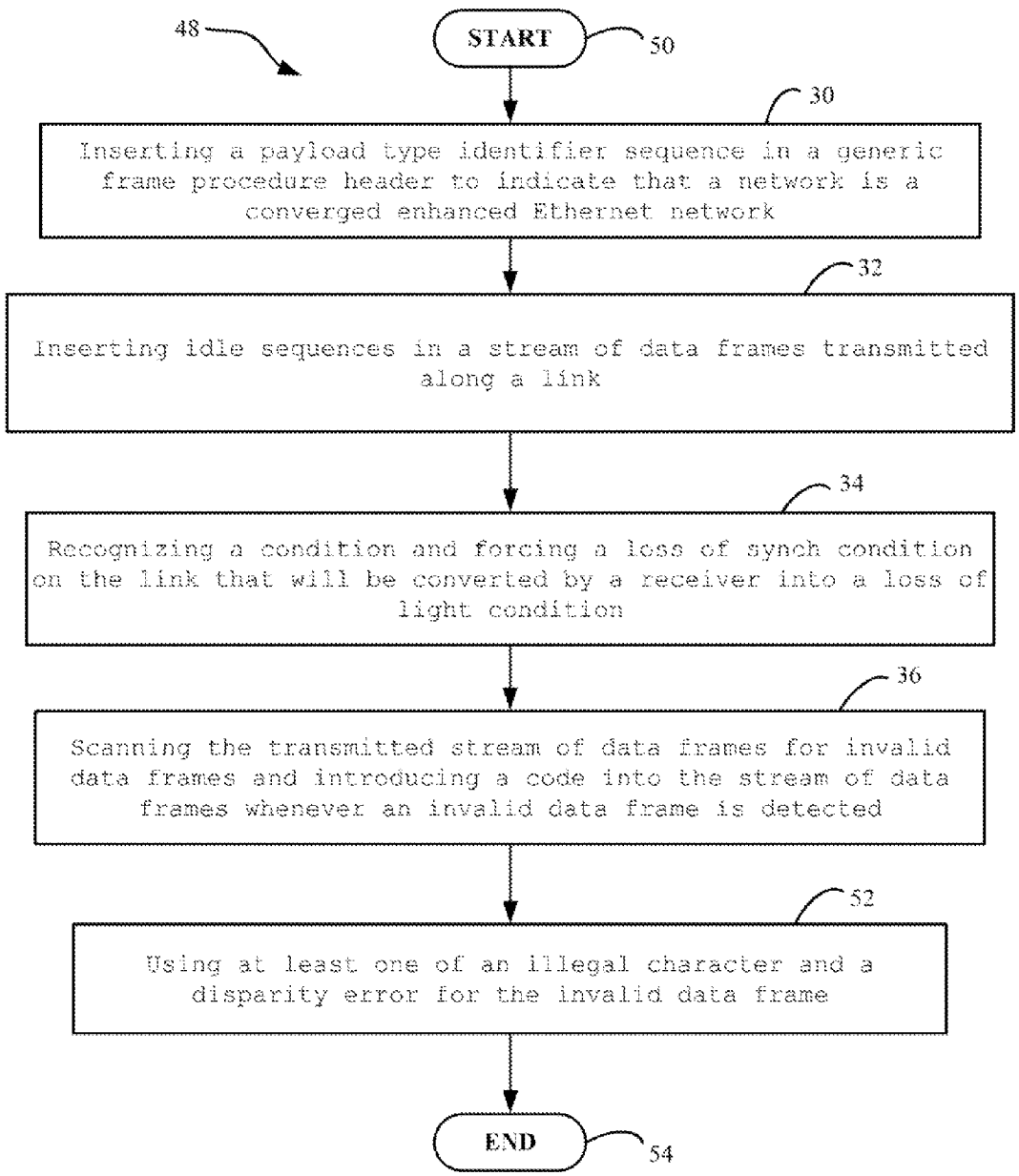
FIG. 4 is a flowchart illustrating method aspects according to the method of FIG. 2.

In another method embodiment, which is now described with reference to flowchart 48 of FIG. 4, the method begins at Block 50. The method may include the steps of FIG. 2 at Blocks 30, 32, 34, and 36. The method may further include using at least one of an illegal character and a disparity error for the invalid data frame at Block 52. The method ends at Block 54.

Figure 5:
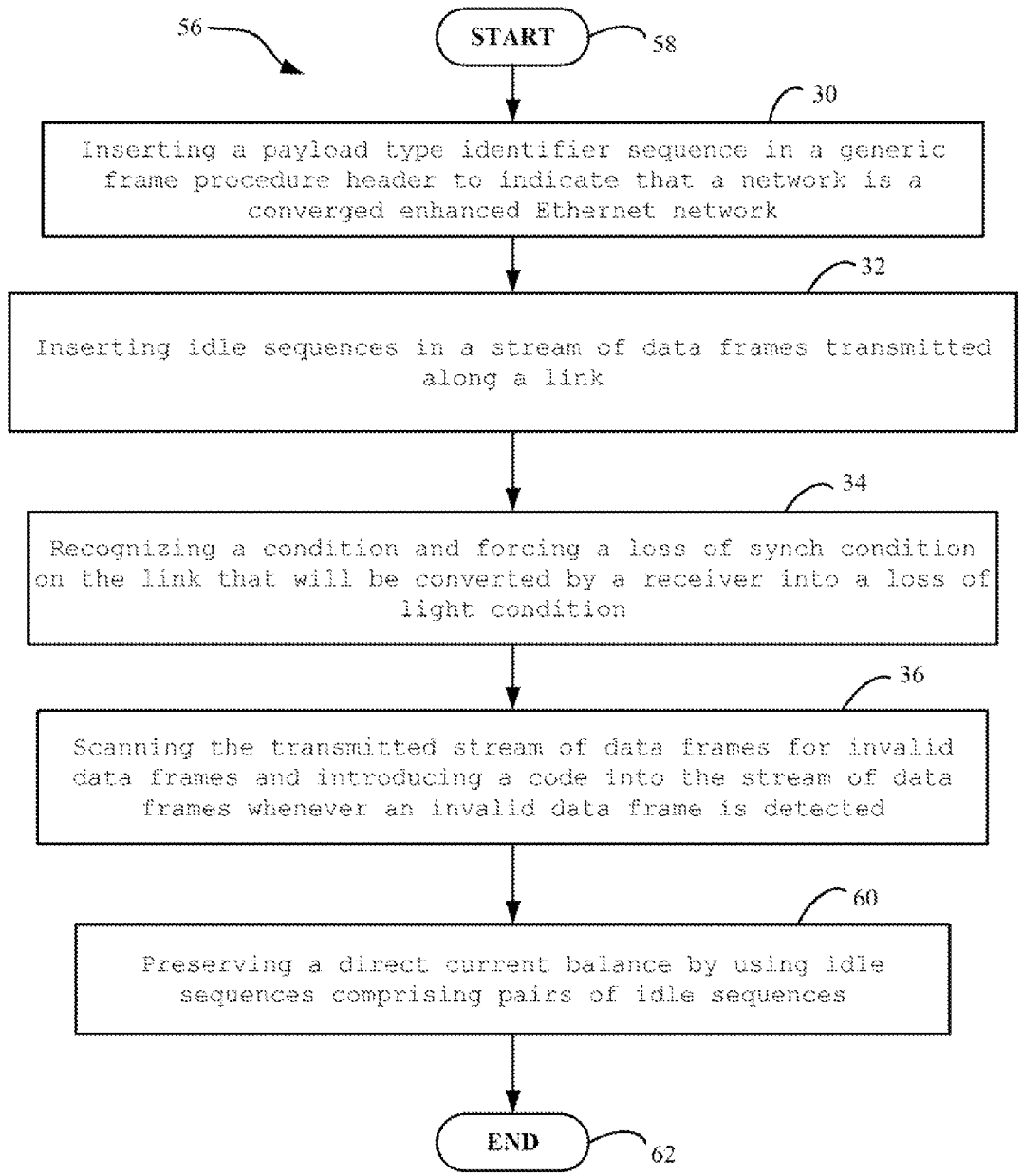
FIG. 5 is a flowchart illustrating method aspects according to the method of FIG. 2.

In another method embodiment, which is now described with reference to flowchart 56 of FIG. 5, the method begins at Block 58. The method may include the steps of FIG. 2 at Blocks 30, 32, 34, and 36. The method may additionally include preserving a direct current balance by using idle sequences comprising pairs of idle sequences at Block 60. The method ends at Block 62.

Figure 6:
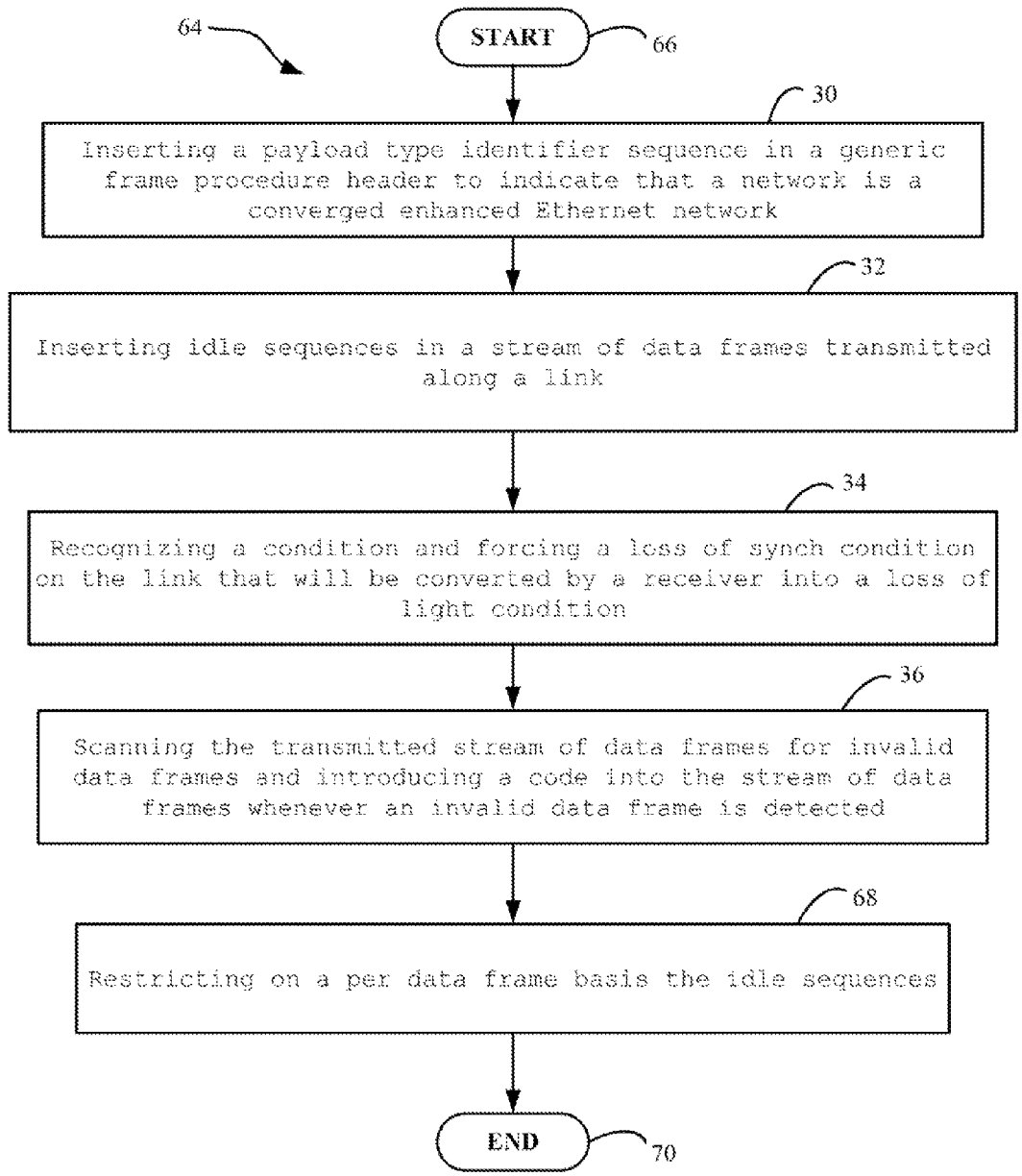
FIG. 6 is a flowchart illustrating method aspects according to the method of FIG. 2.

In another method embodiment, which is now described with reference to flowchart 64 of FIG. 6, the method begins at Block 66. The method may include the steps of FIG. 2 at Blocks 30, 32, 34, and 36. The method may also include restricting on a per data frame basis the idle sequences at Block 68. The method ends at Block 70.

Figure 7:
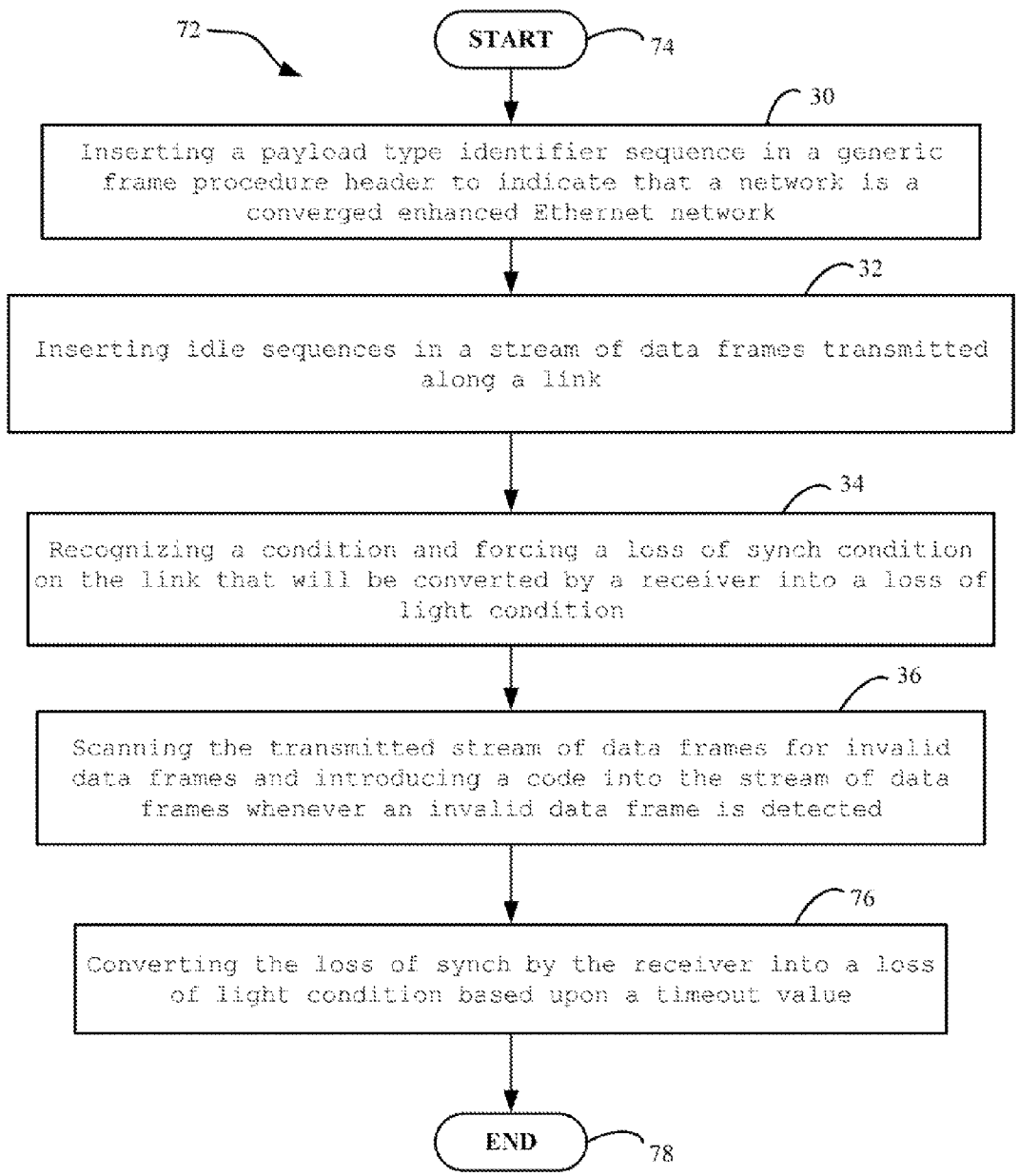
FIG. 7 is a flowchart illustrating method aspects according to the method of FIG. 2.

In another method embodiment, which is now described with reference to flowchart 72 of FIG. 7, the method begins at Block 74. The method may include the steps of FIG. 2 at Blocks 30, 32, 34, and 36. The method may further include converting the loss of synchronization by the receiver into a loss of light condition based upon a timeout value at Block 76. The method ends at Block 78.

Another aspect of the invention is a computer readable program codes coupled to tangible media to improve a converged enhanced Ethernet network 12. The computer readable program codes may be configured to cause the program to insert a payload type identifier sequence in a generic frame procedure header to indicate that a network is a converged enhanced Ethernet network 12. The computer readable program codes may also insert idle sequences in a stream of data frames transmitted along a link 20. The computer readable program codes may further recognize a condition and force a loss of synchronization condition on the link 20 that will be converted by a receiver 22 into a loss of light condition. The computer readable program codes may additionally scan the transmitted stream of data frames for invalid data frames and introduce a code into the stream of data frames whenever an invalid data frame is detected.

The computer readable program codes may also use unrecognized characters during the forcing of the loss of synchronization condition on the link 20. The computer readable program codes may further use an illegal character and/or a disparity error for the invalid data frame. The computer readable program codes may additionally preserve a direct current balance by using idle sequences comprising pairs of idle sequences.

The computer readable program codes may also restrict on a per data frame basis the idle sequences. The computer readable program codes may further convert the loss of synchronization by the receiver into a loss of light condition based upon a timeout value.

In view of the foregoing, the adapter system 10 improves a Converged Enhanced Ethernet network 12. For example, CEE uses 64/66B encoding for transmission over long distance, which is not compatible with legacy 8/10B encoded networks.

As noted above, long distance connectivity across metropolitan area fiber optic networks is typically based on GFP protocols. In order to adapt these protocols to converged networking the following features which are not currently defined by existing networking protocols should be considered.

Propagating loss of light (LOL) and loss of synchronization (LOS) conditions is one such feature. This is done by defining a new payload type identifier (PTI) sequence in the GFP frame header to denote a converged network 12. The LOL/LOS conditions are not defined for converged fabrics. Instead, system 10 uses unrecognized characters to force an LOS condition on the link 20; when this state is recognized for a converged data frame, it will be converted into an LOL state by the link receiver 22 based on a protocol specific timeout value (for example, 0.1 microseconds on an intersystem channel (ISC) channel or 500 microseconds on a Fibre Connectivity (FICON) channel).

Another feature is for data rate adaptation. To transcode 8/10B data into 64/66B data, the 8/10B data is decoded into individual characters (either data or control sequences). When it is re-encoded as 64/66B data, a protocol specific idle sequence is inserted into the data path (idles are inserted in pairs to preserve DC balance). System 10 may define the minimum and maximum number of continuous idles which can be used per data frame. System 10 also defines rules for deleting idles without corrupting the frames.

Another feature is for disparity balancing. The transmit data stream is scanned by system 10 for valid encoded data frames, and a mismatch indicates either an illegal character or a disparity error. A neutral disparity code word is inserted into the data stream to identify this condition and incorporated into the GFP payload for transmission. Note that International Business Machines (IBM) offers several unique protocols on the market today, including ISC on System Z, Parallel Sysplex InfiniBand (PSIFB) announced May 2008, and others.

System 10 includes a method for use in a CEE network 12 that has a transmitter 14 on one end of a link 20 and a receiver 22 on the other end of the link for receiving a stream of data frames and for examining those data frames for conditions that prevent the data frames from being reproduced at the receiver. The method includes, at the transmitter 14, inserting a payload type identifier sequence in the frame header of the generic frame procedure to indicate that the network is a CEE network 12, and inserting a predetermined number of idle sequences in a stream of data frames transmitted along the link 20. The method also includes, at the receiver 22, recognizing a condition (e.g., loss of light or loss of synchronization) and forcing an LOS condition that will be converted by the receiver into an LOL condition, and scanning the received stream of data frames for invalid data frames and inserting a predetermined code into the stream of data frames whenever an invalid data frame (e.g., due to illegal character or a disparity error) is detected.

System 10 addresses the fact that CEE uses 64/66B encoding for transmission over long distance, which is not compatible with legacy 8/10B encoded networks. System 10 maps between legacy 8/10B encoded data and CEE based on Generic Frame Procedure (GFP) for extended distance networking.

As noted above, data transmission across metropolitan area distances (100-300 km) is described in the International Telecommunications Union (ITU) document G.7041 called Generic Frame Procedure (GFP). This is intended to allow standard datacom protocols which use 8/10B encoding to be transported across installed networks which employ 64/66B encoding at low incremental cost by encapsulating the data in a digital wrapper. This approach is used, for example, by IBM qualified wavelength division multiplexing (WDM) products. However, since the GFP approach was designed without knowledge of recently emerging protocols for converged enhanced Ethernet (CEE) and Fibre Channel over CEE (FCoCEE), also known as converged networks, it is not possible to transport CEE or FCoCEE links over GFP at this time.

The basic GFP procedure for 8/10B transport involves decoding each 10 bit character of an 8B/10B data sequence, and mapping the result into either an 8 bit data character or a recognized control character. This data is then re-encoded as a 64B/66B data sequence, with control characters mapped into a pre-determined set of 64/66B control characters. In GFP terminology, the resulting data sequences or control characters are known as "words". Such differs from the server definition of a word, which is usually taken as either a 4 byte quantity or a 40 bit string of four 8B/10B characters. The following will use the GFP terminology for consistency throughout the remainder of this discussion.

A group of 8 such words is assembled into an octet, which is provided with additional control and error flags (note that this differs from the server definition of an octet, which is usually taken as an 8-bit byte). A group of 8 octets is then assembled into a "superblock", scrambled, and a cyclic redundancy check (CRC) error check field is added. The resulting frames are compliant with routing through a metropolitan area network (MAN) network with flow control, including quality of service and related features. The original 8/10 encoded data is reassembled at the other end of the network.

There are a number of features which system 10 defines in order to make converged fabric data frames operate using this method. First, system 10 defines a method of handling running disparity of the data upon entering and exiting the GFP network (note that some implementations of converged fabrics may check for proper disparity and will generate errors if it is incorrect).

The original data uses 8B/10B encoding, which is designed to help reduce bit errors through various methods, such as maintaining DC balance. The DC balance is measured by keeping track of running disparity on codewords. The running disparity is either positive (more 1s than 0s have been sent) or negative (more 0s than 1s have been sent).

In order to maintain DC balance, each 8 bit character and each of the recognized special control characters have two possible 10-bit encodings. Many of the 8 bit characters and special control characters have a single DC balanced 10-bit encoding. These encodings have the five zeros and five ones. However, not all possible 8 bit characters and special control characters can be encoded into DC balanced 10-bit characters. These characters require 10-bit encodings with four zeroes and six ones, or four ones and six zeroes, and to maintain DC balance, these characters have two possible encodings, one with four zeroes and six ones and another with four ones and six zeroes. Depending on running disparity, the 8B/10B encoder normally selects which of the two possible encodings to transmit. Specifically, the disparity is maintained if there have been an equal number of 1s and 0s transmitted, or it can be flipped from either positive to negative or vice versa.

When 8/10B data frames first enter a data transcoder, the initial running disparity can be assumed either positive or negative (upon power-on reset, or transition from a loss of signal or loss of synchronization state). A lookup table can be provided to search for the appropriate valid codeword (either + or − depending on the assumed initial disparity). If no match is found, then either an illegal word or a legal word with a running disparity error has been detected.

In one embodiment, system 10 inserts an existing GFP code which corresponds to 8B/10B code violations, and then this error code is inserted into a neutral disparity sequence which is not recognized as a valid 8/10B codeword. System 10 also uses different codewords depending on the beginning running disparity, to signify either negative initial disparity or positive initial disparity. These codes would be recognized by the GFP transcoder embedded in the data center switches with MAN attachments. When the data exits from the GFP transcoder at the other end of the network, this error condition would be decoded and recognized as an 8/10B code error, which would be handled transparently by the server. As an alternate embodiment, the decoded error condition could be recognized and generate an error code that would be mapped into the 64/65B frame.

A second issue addressed by system 10 is data rate adaptation for 8/10B signals encapsulated using GFP. When 8/10B CEE or FCoCEE traffic enters the GFP transcoder, rate adaptation occurs during the 64/66B encoding process. Fixed length GFP frames are used, padded with the GFP idle character, which is later removed by a second transcoder as the data exists the network.

Data rate adaptation is facilitated by protocol specific rules governing the inter-packet gap (IPG). In this case, system 10 specifies the minimum and maximum number of idle characters that are inserted between two data words.

The GFP mapping can then preserve all of the inbound data, control, and/or IPG information when recoding to 64/66B blocks. In one embodiment, system 10 uses a minimum of 4 idle characters and a maximum of 6 idle characters be maintained for GFP rate adaptation. In another embodiment, system 10 uses idle characters inserted or removed in pairs. The 64/66B encoded data is then mapped into GFP frames which are padded with GFP idle characters, management, and/or control frames inserted between GFP data frames, in order to rate adapt to the higher bandwidth MAN transport channel.

In one embodiment, system 10 includes the means to handle protocol specific signal conditions, such as loss of signal (also called loss of light) and loss of 8/10 code synchronization which are used for link initialization and recovery. CEE and FCoCEE are switched fabrics, with similar security requirements as current storage area networks. In particular, any state change which occurs within the fabric (such as swapped optical cables) propagates a state change notification (such as loss of light or loss of synchronization) to the network endpoints.

In one embodiment, system 10 addresses loss of signal and loss of synchronization conditions. For example, GFP mapping includes a "client signal fail" indication, or CSF, which may be used to propagate these conditions over the GFP network. Specifically, the payload header of a GFP frame contains a two-octet field which specifies the content and format of the GFP frame payload. This includes a 3-bit subfield called the Payload Type Identifier (PTI).

When PTI is set to 100, the GFP transcoder recognizes the payload as management information rather than client data. Once system 10 identifies the frame as containing management information, an 8-bit field called User Payload Identification (UPI) may be set.

For example, setting UPI=0000 0001 will indicate loss of signal, and setting UPI=0000 0010 will indicate loss of character synchronization. Both of these states are known as "client signal fail" or CSF events.

If a CSF event occurs within a GFP data frame, system 10 provides, for a converged data frame, the remainder of the 64/66B block encoding is filled with 8/10 error codes, which are decoded as data errors by the server at the exit of the GFP network. This is intended to force the remote server into a loss of synchronization condition with appropriate error handling.

If this condition persists for more than a protocol specific timeout interval (for example, 500 ms for a Fibre Channel data frame) or if loss of light is detected, then system 10 provides that the inbound GFP transcoder will propagate this condition using the corresponding UPI code and the outbound GFP transcoder will force a loss of signal condition and associated recovery actions at the downstream server. Note that for completeness, when converged data is transmitted over the GFP network, system 10 defines a new UPI for this data type which will distinguish it from other data payloads. For example, system 10 provides that when PTI=010 and FCoCEE data is used, then we will set UPI=1010 1010.

In summary, system 10 describes the features for an 8/10B CEE or FCoCEE link 20 to propagate transparently across a GFP network 12. This includes handling running disparity on the links 20, handling data rate adaptation, and/or propagating loss of light and loss of synchronization conditions.

Figure 8:
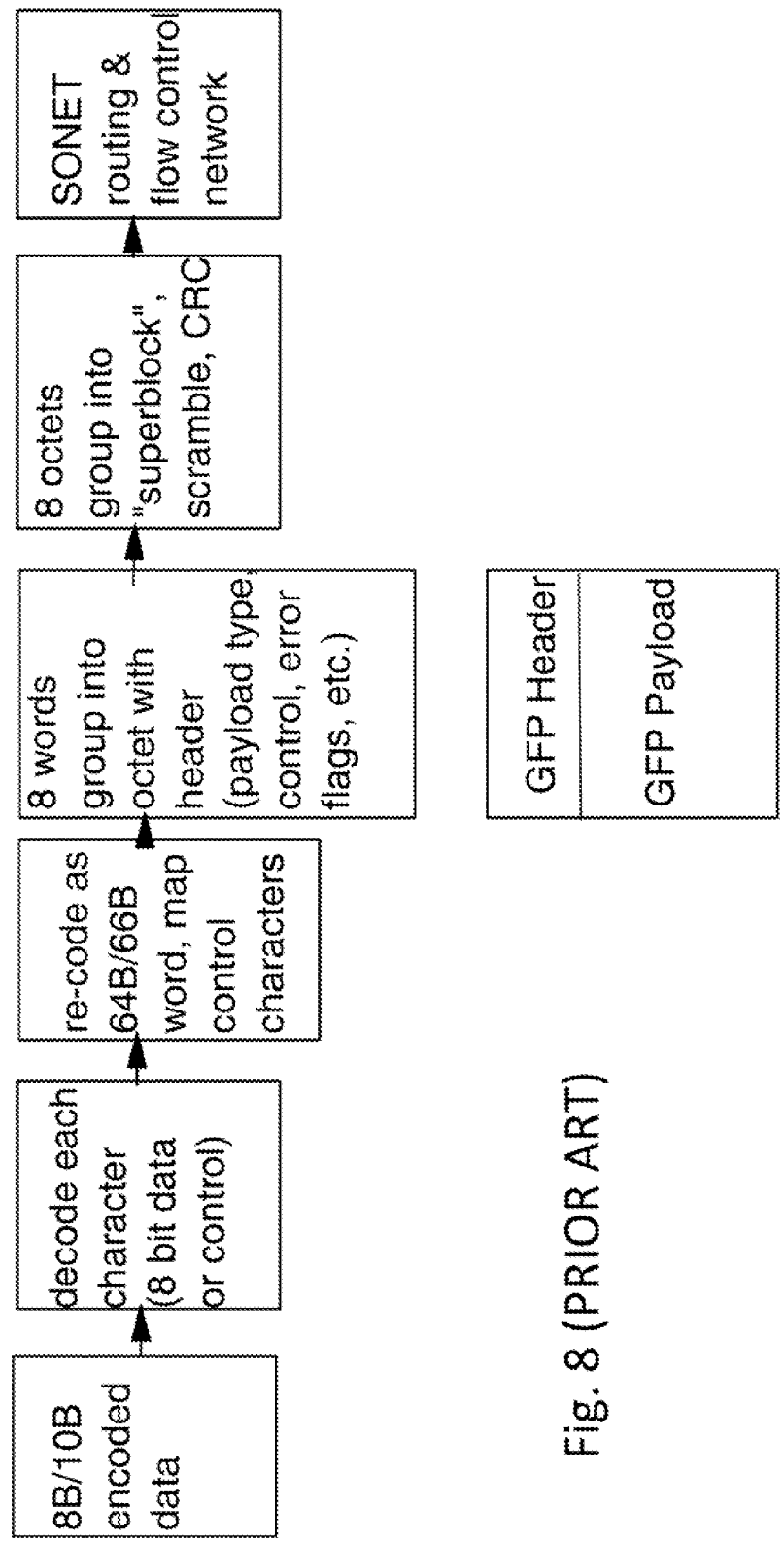
FIG. 8 is a flowchart illustrating the prior art Generic Frame Procedure.

Referring now to FIG. 8, which illustrates the prior art GFP. The table below illustrates the prior art GFP data and control character mapping.

| | GFP Date and Control Character Mapping | | |
|---|---|---|---|
| Name | RD− | RD+ | 64/65 Bit Mapping |
| K28.0 | 001111 0100 | 110000 1011 | 0001 |
| K28.1 | 001111 1001 | 110000 0110 | 0001 |
| 10B_err | not recognized | not recognized | 1100 |
| GFP idle 65B_pad | not recognized | not recognized | 1101 |

System 10 uses encapsulation where the table below illustrates the GFP header fields and PTI=000 for user data (ESCON, etc.) and PTI=100 for user management. For instance, Loss of synchronization and Loss of light propagation for 8/10B is encapsulated within CEE in system 10. Further, when sending data, system 10 defines an unique PTI for CEE channels, which does not exist today (note this is one example, other sequences may be used). When sending management information, UPI=0000 0010 for client signal failure, loss of synchronization.

| Payload Type Identifyer (PTI) 3 bit | Field ID 1 bit | Ex. Header 4 bit |
|---|---|---|
| | User Payload Identifyer (UPI) 8 bit | |

Figure 9:
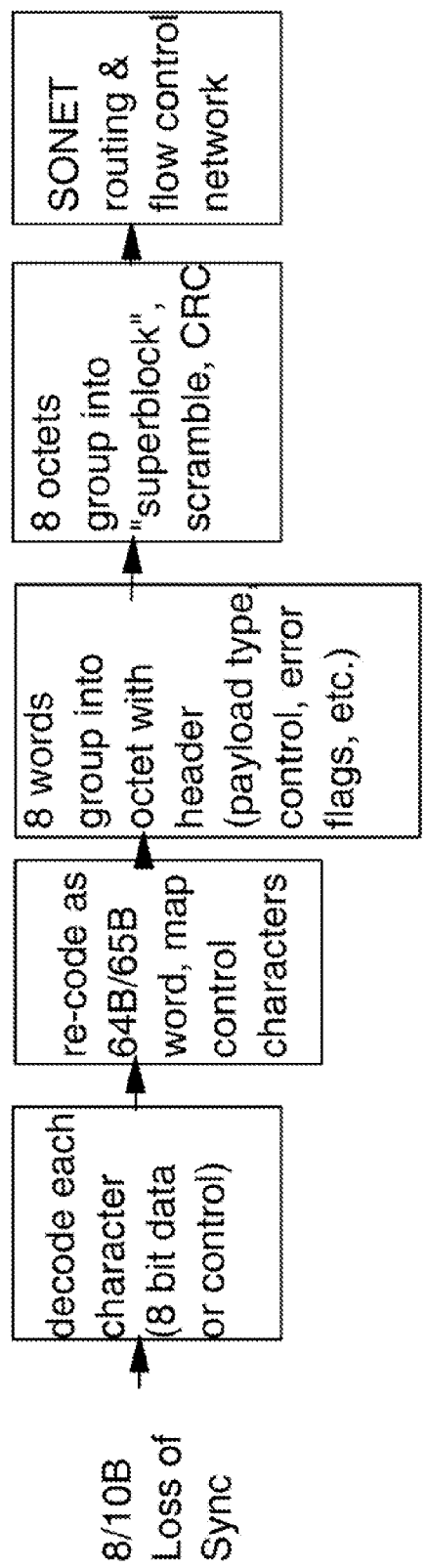
FIG. 9 is a flowchart illustrating loss of synchronization and loss of light propagation for 8/10B encapsulated within CEE in accordance with the invention.

Many protocols require transparent propagation of loss of light/synchronization conditions across a CEE fabric. This is not currently defined by CEE. System 10 uses unrecognized characters to force an LOS state, which is recognized by the CEE switch and converted into a LOL state based on payload specific timeout values (see FIG. 9).

In addition, system 10 sets the header PTI=100 (management information), UPI=Loss of Sync, and Fill Payload with 10B_err. Output from GFP network 12 generates unrecognized 8/10 characters and force loss of synchronization on server, within protocol specific timeouts. For example, on an ISC channel: If condition persists for more than 0.1 milliseconds, assume loss of signal; reset UPI to new loss of light identification state, drop light to client side interfaces; proceed similarly for other protocols such as IB, if condition persists for more than 0.5 milliseconds and FICON channel, if condition persists for more than 500 microseconds.

Figure 10:
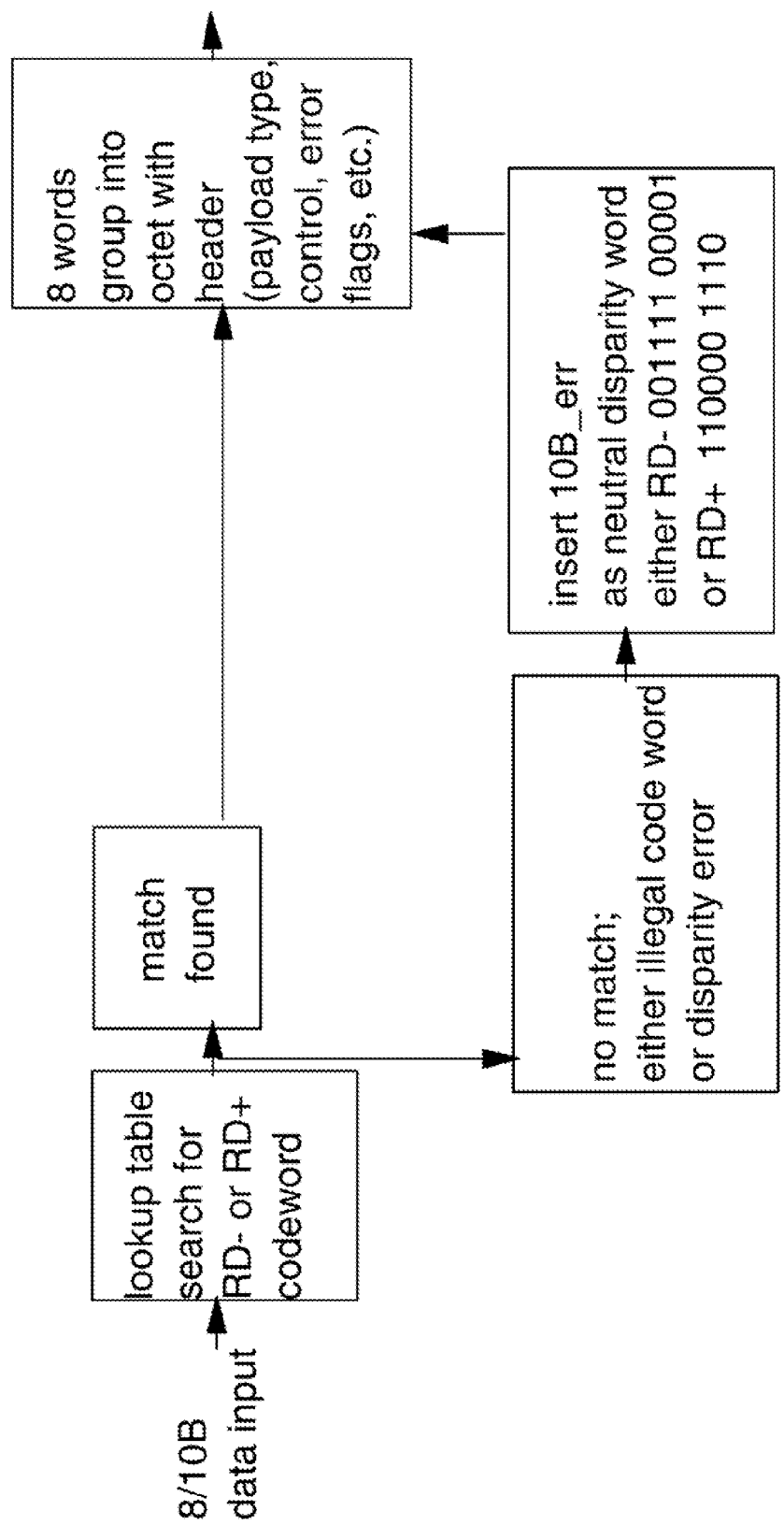
FIG. 10 is a flowchart illustrating Maintaining disparity balance for encapsulated CEE fabrics based on GFP in accordance with the invention.
Figure 11:
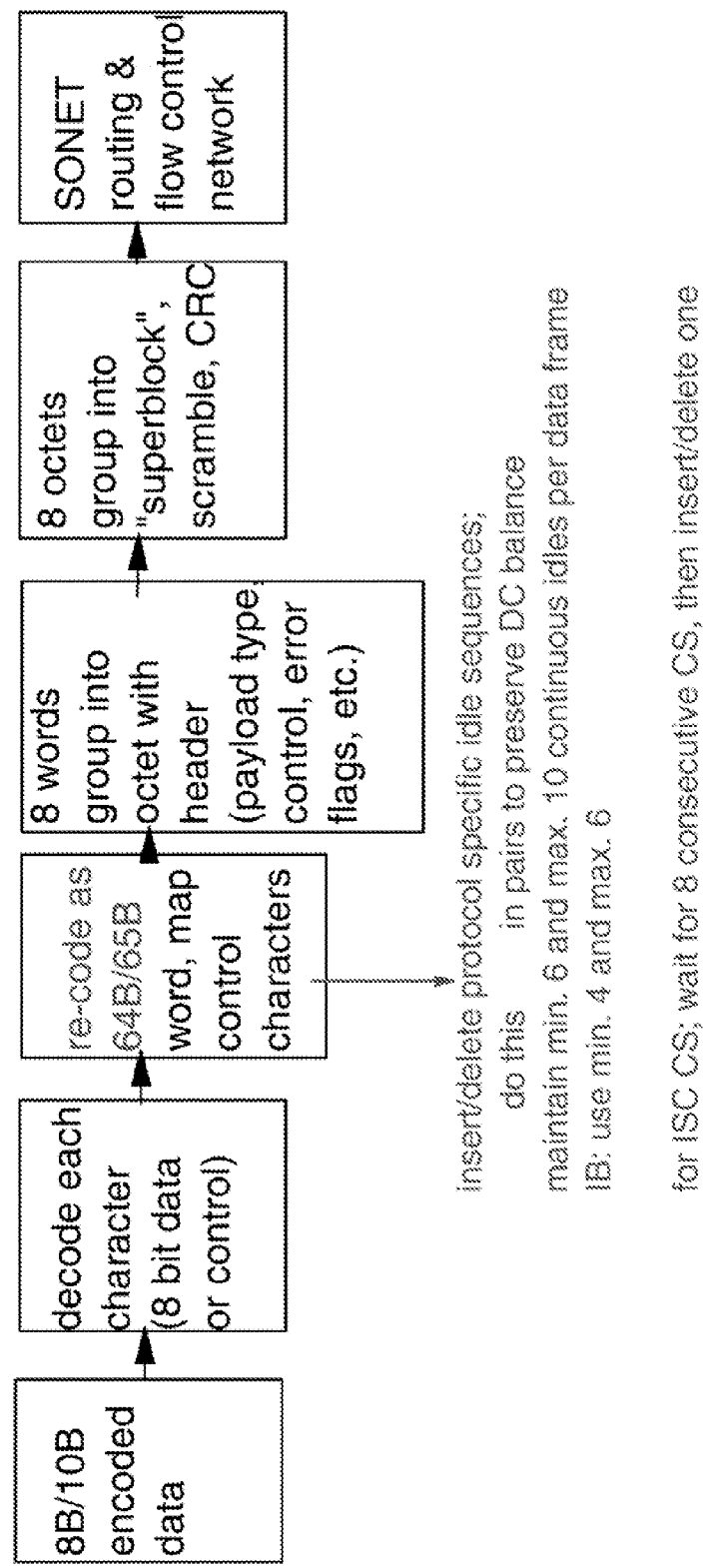
FIG. 11 illustrates a flowchart illustrating data rate adaptation rules for CEE networks based on GFP in accordance with the invention.

Maintaining disparity balance for encapsulated CEE fabrics based on GFP uses definition of both + and − disparity words as illustrated in FIG. 10. In addition, data rate adaptation rules for CEE networks based on GFP for system 10 are illustrated in FIG. 11.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   embedding a Generic Frame Procedure (GFP) transcoder in data center switches with metropolitan area network (MAN) attachments, the GFP transcoder including a digital circuit;
   recognizing, by the GFP transcoder, different codewords, depending on the beginning running disparity, inserted into a neutral disparity sequence;
   recognizing, by the GFP transcoder, a condition and forcing a loss of synchronization condition on a link that will be converted by the GFP transcoder into a loss of light condition; and
   scanning the transmitted stream of data frames for invalid data frames and introducing a code into the stream of data frames whenever an invalid data frame is detected.

2. The method of claim 1 wherein the condition is at least one of loss of synchronization and loss of light.

3. The method of claim 1 further comprising using unrecognized characters during the forcing of the loss of synchronization condition on the link.

4. The method of claim 1 further comprising using at least one of an illegal character and a disparity error for the invalid data frame.

5. The method of claim 1 further comprising:
   inserting a payload type identifier sequence in a generic frame procedure header to indicate that a network is a converged enhanced Ethernet network; and
   inserting idle sequences in a stream of data frames transmitted along the link.

6. The method of claim 5 further comprising preserving a direct current balance by using idle sequences comprising pairs of idle sequences.

7. The method of claim 5 further comprising restricting on a per data frame basis the idle sequences.

8. The method of claim 1 further comprising converting the loss of synchronization by the GFP transcoder into a loss of light condition based upon a timeout value.

\* \* \* \* \*